(No Model.)
A. HYDE.
SCREW CUTTING LATHE.
No. 247,764.  Patented Oct. 4, 1881.
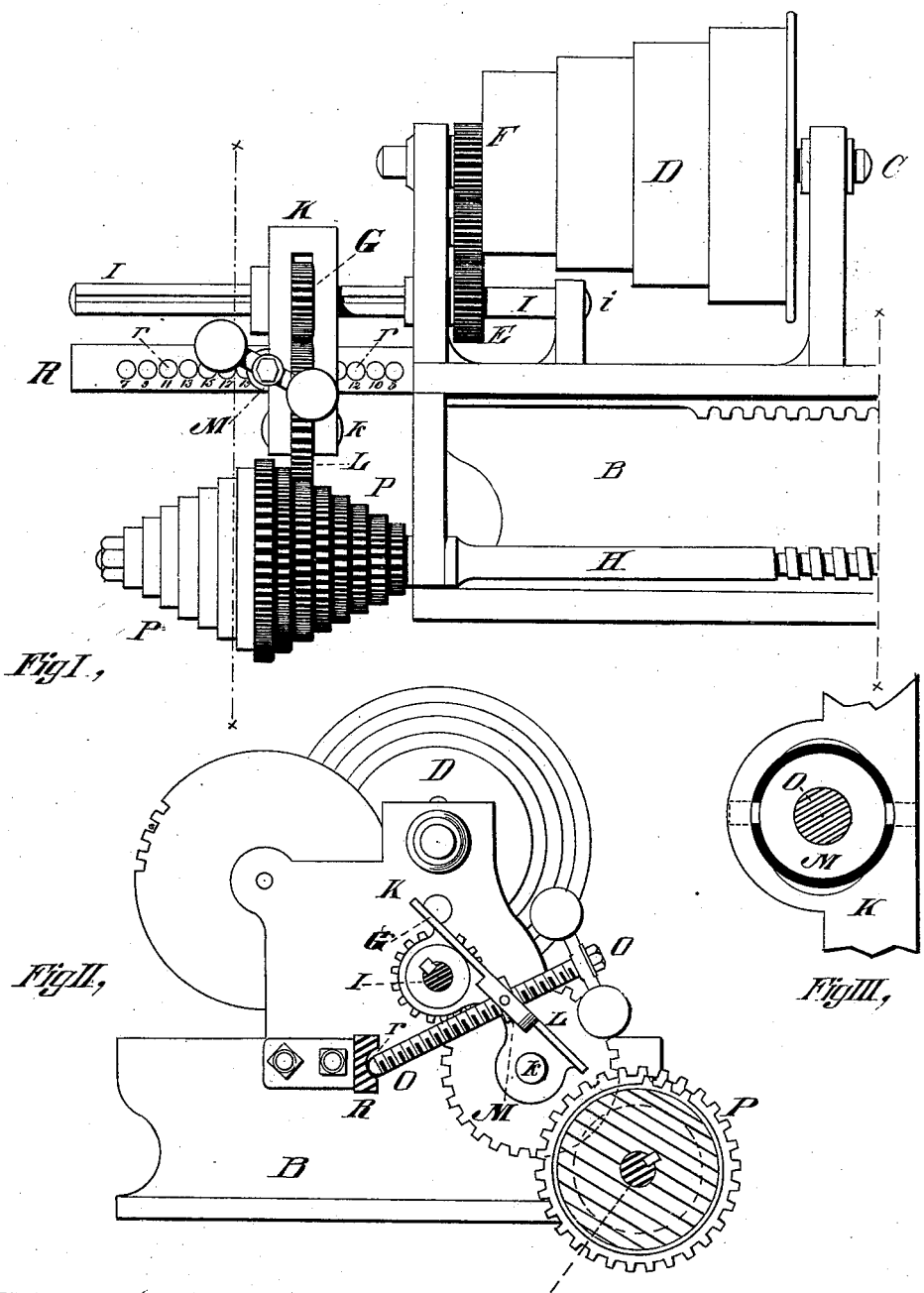
Witnesses,
W. H. Burrall
L. M. Brown
Inventor,
Andrew Hyde,
by R. F. Hyde,
Atty.

UNITED STATES PATENT OFFICE.

ANDREW HYDE, OF HATFIELD, MASSACHUSETTS.

SCREW-CUTTING LATHE.

SPECIFICATION forming part of Letters Patent No. 247,764, dated October 4, 1881.

Application filed June 17, 1881. (No model.)

*To all whom it may concern:*

Be it known that I, ANDREW HYDE, a citizen of the United States, residing at Hatfield, in the county of Hampshire and State of Massachusetts, have invented a new and useful Improvement in Screw-Cutting Lathes, of which the following is a specification.

My invention relates to improvements in that class of lathes known as "screw-cutting lathes," in which the feed is governed relatively to the live center of the lathe by interchangeable differential gearing connecting the driving and feed shafts; and the object of my invention is to obviate the necessity heretofore existing of having any such gearing detached from the machine, with its attendant disadvantages, by making the gearing required to govern the feed a fixed part of the lathe, and so arranged thereupon as to enable any required change to be made without loss of time. I attain this object by the mechanism illustrated in the accompanying drawings, in which—

Figure I is a side elevation of so much of a lathe as is necessary to show my invention. Fig. II is an end elevation of the same in partial section, and Fig. III is a detail view.

B is the frame of the lathe, C the driving-shaft carrying the screw-cutting tool or die, and D the pulley. The gear E, connected to the one F upon the driving-shaft by an intermediate gear, and the one G for conveying the motion through an intermediate gear to the one upon the feed-shaft H, are both arranged upon a stem, I, as is common; but beyond its extent on both sides of its journal in the head of the lathe, hitherto limited to that required to connect the two spurs keyed to it, I prolong the stem I, to form in effect a counter-shaft, within the lathe to have an additional journal at $i$ in a projection from the bed of the lathe for the purpose of strengthening it, and without to provide an extended stem, upon which the position of gear G may be changed at will. The gear G is splined to the shaft I, so that it may be slid to any point thereon. Sleeved to the hub of gear G is the frame K. The frame K affords a journal at $k$ to the gear L, engaging directly with the gear upon the feed-shaft H, and also a nut, M, to the screw O. The screw O, provided with a convenient handle, has one end bearing against a surface, R, parallel to the stem I; and it will be seen that as the frame K is hinged upon the center of shaft I, in being hinged to the hub of gear G, the gear L may be swung with the frame and remain connected with the gear G, and that the screw O, bearing against a fixed surface, will swing the gear L as it is turned. Secured firmly together in mass and to the shaft H, and graduated relatively to cause the teeth of one to clear on one side the teeth of an adjacent one, are all of the gears required for regulating the feed of the lathe.

When a change is to be made it is only necessary to slide the gear G upon its stem I, and with it the frame K, with screw O and gear L, to a position opposite the required gear of the cone P, and bring, by means of screw O, the gear L into operative connection therewith.

In practice I arrange the gearing, making the cone P to form a double cone, as shown in Fig. I, by building up one cone of all the gears for causing an even number of threads to be cut to the inch upon the screw, and the other cone of those required to cut the intermediate and odd numbers, for the reason that were all arranged to form one cone the differences in their perimeters would be so little that the gear L would be inclosed in engaging with any but the outside gearing, and would be liable to ride upon the adjacent edges of one were there any mechanical imperfection of finish, or were any accumulated dirt unable to free itself; but by arranging them as shown no difficulty of the kind is experienced. I also form the surface R, against which the end of screw O bears, of a flat face, as shown, and provide it with semicircular sockets $r$ at points opposite the gears of cone P, and, further, number in plain figures each socket with the number corresponding to the screw-threads to the inch its opposite gear of the cone will cause to be cut. The surface R is formed upon one side of an angle-bar firmly bolted to the lathe-frame, as shown in Fig. II.

In order that the end of screw O may always remain in the socket $r$, in which it is for the time placed, I hinge the nut M in the frame, as shown in Fig. III in enlarged view, as a much stronger and simpler method of providing for the movement of the frame than a movable socket to the screw end or a quadrant having a sliding base would be.

By these means a strong and simple device is provided for enabling the gearing fixed to the lathe to be securely and without loss of time operated to change the feed to cut any screw, and the time heretofore lost in finding and fitting gearing for any change is entirely saved, together with the material loss arising from misplacement of such detached portions of the lathe.

Now, having described my invention, what I claim as new, and desire to secure by Letters Patent, is—

1. In a screw-cutting lathe, the combination, with shaft H and with stem I, provided with spur G, pinion L, and frame k, all adjustable, as shown and described, upon stem I and relative to shaft H, of the double cone of gearing P, having one cone formed of the gearing for cutting even numbers of threads, and the other consisting of those required to cut the intermediate odd numbers, for the purpose as set forth.

2. The combination of stem I, gear G, hinged frame K, having hinged nut M, and gear L, screw O, surface R, provided with the sockets r, and cone P, built up of assorted gearing, all combined and arranged to operate in the manner and for the purpose set forth.

ANDREW HYDE.

Witnesses:
H. F. HYDE,
J. E. PORTER.